United States Patent

Turner

[11] Patent Number: 6,015,080
[45] Date of Patent: Jan. 18, 2000

[54] METHOD OF MANUFACTURING CLAD METAL PLATES

[76] Inventor: William C. Turner, 85 Pinto La., Sedona, Ariz. 86336

[21] Appl. No.: 08/829,985

[22] Filed: Apr. 1, 1997

[51] Int. Cl.[7] ............................. B23K 20/00; B23K 31/02
[52] U.S. Cl. ........................................... 228/158; 228/118
[58] Field of Search .................... 228/118, 158, 228/175, 194, 195, 234.1

[56] References Cited

U.S. PATENT DOCUMENTS

| | | | |
|---|---|---|---|
| 4,598,859 | 7/1986 | Cajthaml, Jr. et al. | 228/185 |
| 4,790,471 | 12/1988 | Turner | 228/131 |
| 4,831,708 | 5/1989 | Yoshiwara et al. | 228/158 |
| 4,869,422 | 9/1989 | Turner | 228/186 |
| 5,022,144 | 6/1991 | Hingorany | 228/107 |

FOREIGN PATENT DOCUMENTS

| | | |
|---|---|---|
| 0 406 688 A2 | 1/1991 | European Pat. Off. . |
| 61-244256 | 10/1986 | Japan . |
| 62-198379 | 8/1987 | Japan . |

*Primary Examiner*—Samuel M. Heinrich
*Attorney, Agent, or Firm*—Head, Johnson & Kachigian

[57] ABSTRACT

A method of manufacturing clad metal plate products by assembling in a stacked array a bottom base plate, a first cladding plate, a second cladding plate and a top base plate, with a separator compound layer between the first and second cladding plates. The peripheral dimensions of the cladding plates being less than the peripheral dimensions of the base plates. A metal rail is welded between the base plates and circumferentially of the cladding plates to form an assembly having a closed environment encompassing the cladding plates. Substantially all water and oxygen are removed from the closed environment. The assembly is then heated to an initial temperature of at least about 1850° F. and, while heated, is rolled or hydraulically pressed to cause the first cladding plate to bond to the bottom base plate and the second cladding plate to bond to the top base plate. Separating the assembly at the separator compound layer provides a first and a second clad plate. In the preferred application of the method, a cladding activator is electrolessly deposited onto the surface of each of the cladding plates that contact a base plate to incorporate liquid interface diffusion bonding of the cladding plates to the base plates.

4 Claims, 2 Drawing Sheets

METHOD OF MANUFACTURING CLAD METAL PLATES

REFERENCE TO PENDING APPLICATIONS

This application is not related to any pending applications.

REFERENCE TO MICROFICHE APPENDIX

This application is not referenced in any microfiche appendix.

BACKGROUND OF THE INVENTION

This invention relates to a method, employing an assembly, for manufacturing clad metal plates, particularly clad steel plates to provide steel plates having a corrosion resistant surface.

For background information relating to the subject of this disclosure, reference should be had to U.S. Pat. No. 4,790,471 that issued Dec. 13, 1988 entitled "Method of Cladding Tubing and Plate Products" and U.S. Pat. No. 4,869,422 that issued Sep. 26, 1989 entitled "Subassembly For Use In Manufacturing A Clad Steel Plate". These previously issued United States patents are incorporated herein by reference. For additional background information relating to the subject matter of this patent application, the United States and Japanese patents cited in U.S. Pat. Nos. 4,790,471 and 4,869,422 are helpful.

This invention is concerned with an improved method of manufacturing clad metal plate products. While the invention is not so limited, it is typically employed in manufacturing steel plates having bonded on one surface a corrosion resistant alloy. For most industrial applications the clad plate is formed by a relatively thick carbon steel substrate that has metallically bonded to it, on one surface, a thin plate of corrosion resistant alloy, such as a nickel base alloy or stainless steel. However, the substrate can be metal plates other than carbon steel and the corrosion resistant alloy other than a nickel alloy or stainless steel. For example, such corrosion resistant alloy may be of a titanium or zirconium base. At the present time, the most important commercial application of the invention is for manufacturing a carbon steel plate having on one surface a nickel based or stainless steel corrosion resistant clad. This product is used for pipes, vessels or other chambers that contain corrosive liquids or gases and is applicable for use in many circumstances where economy, high strength and reliable corrosion resistance are required.

As is pointed out in U.S. Pat. Nos. 4,790,471 and 4,869,422, before the disclosure of the content of such patents, the manufacture of clad plating products in the United States and other countries of the world was performed by cleaning and pickling the base plate and the cladding plate. In this process one faying surface of the base plate and/or cladding plate usually is coated by electrolytic nickel plating. The two plates are assembled together and, at very high pressures and temperatures, and employing high reduction ratios, the plates are hot rolled. This method requires high temperatures and extremely high rolling pressures in order to obtain a metallic forge bond between the base plate and the cladding plate. The nickel plating is used as a diffusion barrier. This technique frequently results in contamination of the cladding plate by carbon from the substrate and formation of brittle carbides at the interface. Further, the finished product has low bond strength.

The new concept provided in U.S. Pat. Nos. 4,790,471 and 4,869,422 have dramatically improved the manufacture of clad plating. The present invention is an advancement of the state of the art represented by U.S. Pat. Nos. 4,790,471 and 4,869,422 and provides a method, employing an assembly, to substantially increase the speed, quality and efficiency of production of clad metal plate products.

BRIEF SUMMARY OF THE INVENTION

A method is described herein for manufacturing clad metal plate products preferably employing an assembly formed of a stacked array having a bottom base plate, a first cladding plate, a second cladding plate, and a top base plate. A separator compound layer is deposited between the first and second cladding plates. The peripheral dimensions of the cladding plates are less than the peripheral dimensions of the base plates.

A metal rail is positioned between the base plates, the rail circumscribing the periphery of the cladding plates. The rail is welded to the base plates around the entire perimeter of the assembly to form a closed environment encompassing the cladding plates. A vent opening is provided in the rail.

A vacuum pump is attached to the vent opening and a vacuum pulled on the closed environment. The pump is operated to the point that the vacuum within the closed environment is reduced to about $10^{-3}$ millibars. In the preferred method of employing the assembly, a vacuum to about $10^{-3}$ millibars is pulled on the closed environment followed by refilling the environment with dry argon to about ambient pressure. Thereafter, the vacuum pump is employed to again pull a vacuum in the closed environment to about $10^{-3}$ millibars. In some instances, it is desirable to repeat this sequence, that is, first pull down a vacuum, back fill with dry argon, pull down a vacuum, back fill with dry argon and then finally pulling down a vacuum again to a pressure of about $10^{-3}$ millibars.

The purpose of pulling a vacuum, with or without back filling with dry argon, is to remove, to the extent practically possible, all of the oxygen and water vapor within the closed environment. It has been learned that the removal of oxygen and water vapor, and particularly the water vapor, is more easily accomplished if the assembly is heated to above the boiling point of water, such as heating the assembly to about 250° F. during the evacuation and back fill process.

After subsequently all the oxygen and water vapor have been removed from the closed environment the vent opening is sealed.

The entire assembly is then heated to an initial temperature of at least about 1850° F. and preferably from about 1900° to 2150° F., and pressure rolled or hydraulically pressed to fusion bond the cladding plates to the base plates with which they abut. In the preferred arrangement of practicing the process, the total thickness of the stacked array forming the assembly is substantially reduced by repeated pressure rolling the assembly. As pressure rolling continues the temperature of the assembly can be decreased to no less than about 1550° F., that is, the assembly is initially heated to at least about 1850° F. and thereafter, during pressure rolling or hydraulic pressing is maintained at a temperature of about 1550° to 2150° F. In some applications the results of the rolling can produce an assembly that is reduced in thickness to about one-seventh of the thickness of the original assembly, however, the specific reduction in thickness of the assembly is primarily concerned with the requirements of the finished clad products.

After the rolling process is completed the finished assembly, which will have increased length and width dimensions in proportion to the reduction in height of the assembly, is prepared by cutting away of the peripheral area, that is, the areas that include the metal rail that circumscribes the cladding plates. The removed material is normally considered to be scrap. The assembly is then disassembled at the separation compound layer to provide a first and a second clad plate.

Using a bonding activator between each of the cladding plates and the base plates results in improved bonding strength and greater reliability, as well as a reduction in micro-porosity. For this reason, when high bonding strength or very high quality is required (typically in about 90% of applications for plated steel) an activator is electrolessly deposited onto the surface of each of the cladding plates that is contiguous to a surface of a base plate. The activator is preferably nickel phosphorous, and most preferably, Ni4P. Ni6P also functions acceptably as a cladding activator. Ni2P and Ni8P aid in the liquid interface diffusion bonding which results from the method above described but are not preferred. As among these four, tests have indicated that the most effective activator is Ni4P. The use of a nickel phosphorous activator in the method disclosed herein allows a reduction in the initial rolling temperature by about 150° F. or more, compared to previously known cladding processes, which reduction is critical in avoiding carbon diffusion into the cladding plate.

The stacked array assembly can be readily checked for leaks during the welding procedure prior to the heating and rolling steps to thereby substantially reduce the rejection ratio of finished products compared to the rejection ratios obtained with previously known methods of manufacturing clad plating.

A better understanding of the invention will be obtained from the following description of the preferred embodiment, taken in conjunction with the attached drawings.

DETAILED DESCRIPTION OF THE PREFERRED EMBODIMENTS

Figure 2:
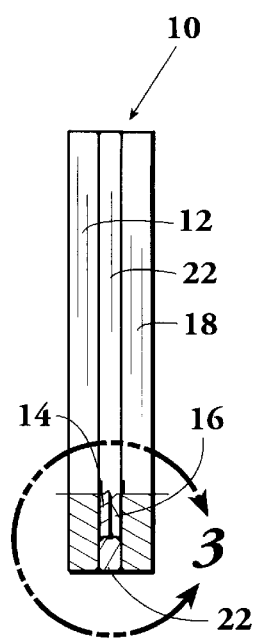
FIG. 2 is an end view of the stacked array of FIG. 1, part of the view being shown in cross-section.
Figure 1:
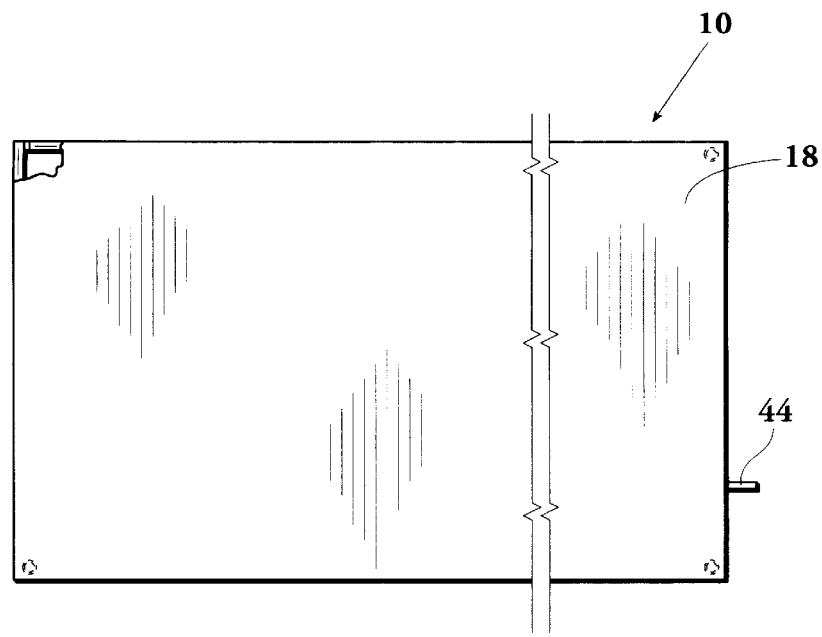
FIG. 1 is a top plan view of a stacked array of base plates and cladding plates as employed in practicing the invention.
Figure 3:
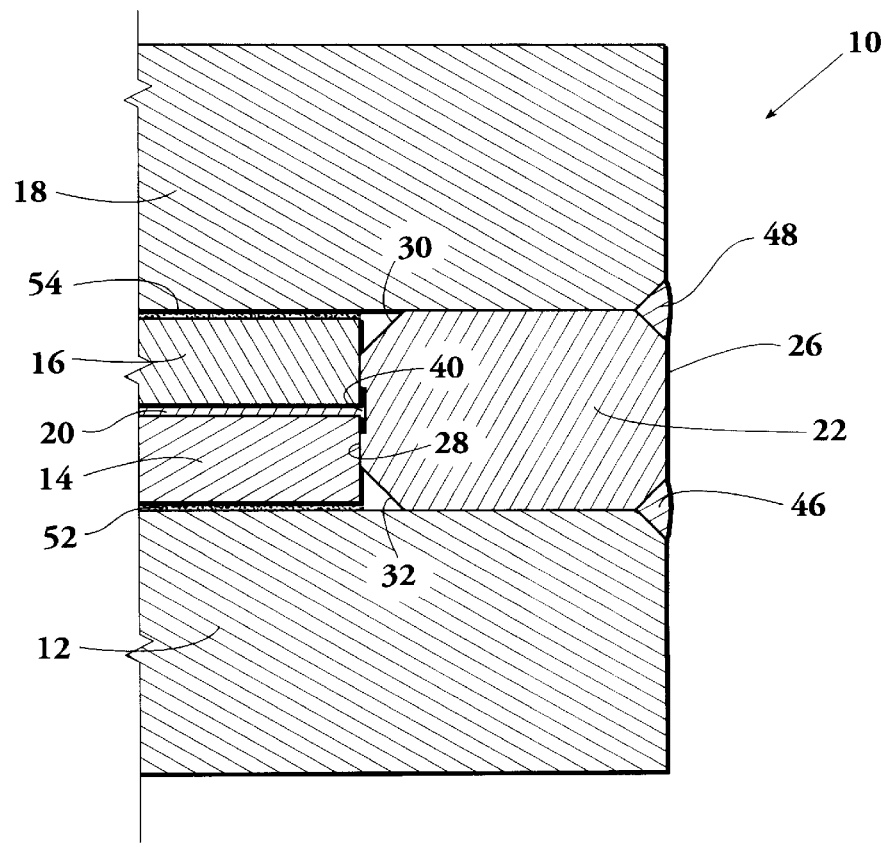
FIG. 3 is an enlarged cross-section view as taken at 3 of FIG. 2 showing the relationship between the top and bottom base plates, the first and second cladding plates, the separator compound layer between the cladding plates, and the metal rail that is positioned between the top and bottom base plates and circumscribing the cladding plates, the metal rail being shown welded to the top and bottom base plates as a means of forming a closed environment surrounding the cladding plates.

Referring first to FIGS. 1, 2 and 3, an assembly is illustrated that is used in manufacturing clad metal plates. These three figures show an assembly generally indicated by the numeral 10. As seen in the enlarged fragmentary cross-sectional view of FIG. 3, the assembly 10 is a stacked array formed of: a bottom base plate 12; a first cladding plate 14; a second cladding plate 16; and a top base plate 18. Positioned between first and second cladding plates 14 and 16 is a separator compound layer 20.

The peripheral dimensions of base plates 12 and 18 are greater than that of cladding plates 14 and 16. Positioned between the base plates and circumferentially of the cladding plates is a metal rail 22. The thickness of rail 22 is equal to the combined thicknesses of cladding plates 14 and 16 and separator compound layer 20.

Figure 5:
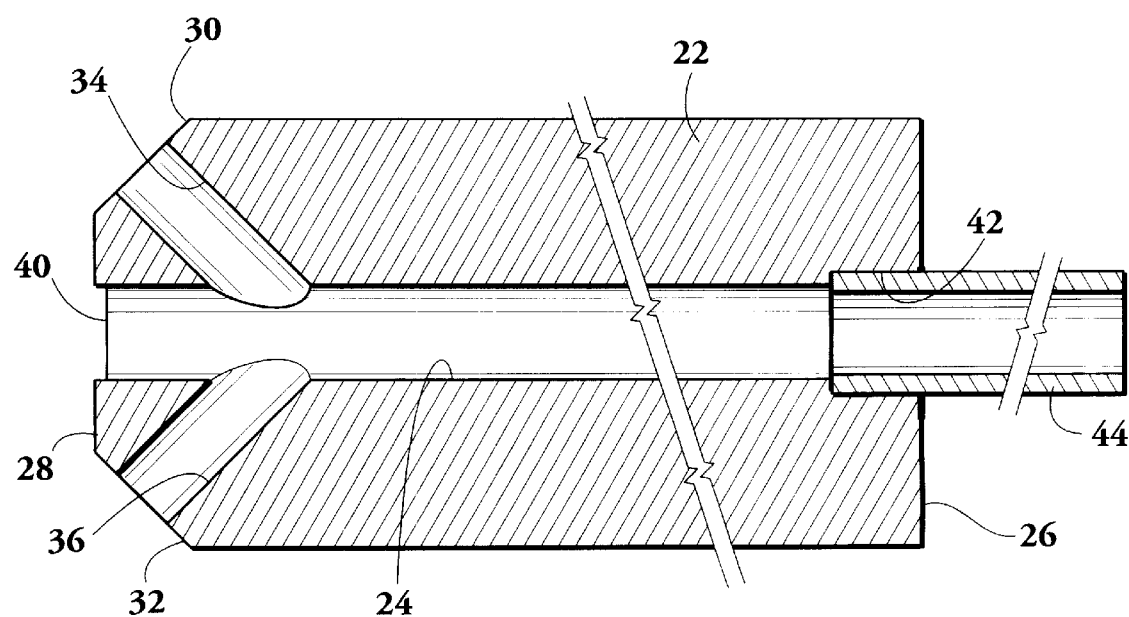
FIG. 5 is an enlarged cross-sectional view of a metal rail of the type used to circumscribe the cladding plates in the stacked array and shows a tube secured to the metal rail in communications with passageways, illustrating one system for applying a vacuum to the closed environment encompassing the cladding plates.

After the plates have been assembled as illustrated in FIGS. 1, 2 and 3, the base plates 12 and 18 are welded to metal rail 22 around the entire circumference of the stacked assembly. The object is to provide a completely closed environment encompassing cladding plates 14 and 16. Access to this closed environment is provided in at least one place by an opening extending through rail 22 as shown in FIG. 5. A passageway 24 is formed from the rail 22 outer peripheral surface 26 to its inner surface 28. Rail 22 is preferably formed with beveled edges 30 and 32 with which branch passageways 34 and 36 communicate. Further, the inner surface 28 is provided with a longitudinal recess 40 that extends around the full interior periphery of the assembled rail. Passageway 24 communicates with longitudinal recess 40.

Received within an enlarged segment 42 of recess 24 is a short length tubular element that provides means of attaching piping (not shown) to the exterior of the assembly.

To achieve a closed environment the bottom and top base plates 12, 18 are welded to rail 22 as indicated at 46 and 48 of FIG. 3, the welds being formed around the entire periphery of the stacked assembly.

The assembly as shown in FIGS. 1, 2 and 3, after having been properly stacked and welded around the perimeter, is ready for use in the process of diffusion bonding of first cladding plate 14 to bottom base plate 12 and second cladding plate 16 to top base plate 18. This disclosure is concerned, in one important aspect, with the critical relationship between effective diffusion bonding and the extraction of oxygen and water vapor from between the base plates and the cladding plates. Therefore, the first step, after providing the assembly of FIGS. 1 through 3, is to evacuate the closed space surrounding the cladding plates of oxygen and water. This is accomplished by pulling down a vacuum in the closed space surrounding the cladding plates by means of a vacuum pump (not shown) connected to tube 44.

Before the step of removing water and oxygen from the closed space surrounding the cladding plates, it is imperative that the integrity of the seal formed by weld 46 and 48 around the periphery of the assembly be verified. This is accomplished by pulling a vacuum on tube 48. Thereafter using a pressurized container a workman can move around the full periphery of the assembly and spray helium gas along the exterior of circumferential welds 46 and 48. A gas detector (not shown) connected in a line extending from tube 44 to a vacuum pump is then employed to detect the presence of helium gas. If a leak exists in welds 46 and 48, the vacuum applied to the assembly will pull helium into the interior of the closed space and thus out through pipe 44 where the presence of helium will be detected. When helium appears in the gas being withdrawn from the assembly, the location of a leak in the weld seams can be fairly closely approximated by the length of delay of the detection of the leak compared to the progress of a workman moving around the perimeter of the stacked assembly. The leak can then be corrected by proper welding. This procedure is completed until no significant leakage of the assembly occurs.

Instead of using helium, ammonia gas may be used. This technique of testing for leakage is known in the industry, however, the criticality of the assembly being essentially leak proof for proper diffusion bonding has not, to the knowledge of the applicant herein, heretofore been fully appreciated. After the assembly has been completed with welds 46 and 48 in place, and the integrity of the welds verified by testing for leaks, the assembly is then ready for completion of the manufacturing process. Vacuum is applied to the closed environment surrounding cladding plates 14 and 16 to reduce the pressure within the closed area to about $10^{-3}$ millibars. In a preferred method of practicing the invention, after reducing the pressure to the interior of the closed assembly to about $10^{-3}$ millibars the closed environment is back filled with an inert gas, dry argon being preferred, to about ambient atmospheric pressure. Thereafter, the closed space is again evacuated by applying a vacuum to tube 44 to reduce the pressure to about $10^{-3}$ millibars. Preferably, this sequence is repeated twice. That is, after a second pumping of a vacuum on the closed assembly is back filled a second time with dry inert gas, preferably argon, the assembly is then a third time evacuated to a vacuum pressure of about $10^{-3}$ millibars. This vacuum is maintained in the confined area surrounding the cladding plates during the balance of the manufacturing process.

It has been discovered that removing all of the water vapor from the confined area of the assembly can be augmented in a significant way by heating the entire assembly to a temperature that exceeds the boiling point of water. For this purpose, the entire assembly is heated to about 250° F. during the evacuation and back filling steps to insure that any molecules of water within the confined area is in the form of a gas (steam).

After the completion of the assembly and the evacuation of water and oxygen from the confined area, the assembly is then ready for rolling or pressing to achieve bonding of the cladding plates to the base plates. Rolling pressing sheet material to reduce the thickness thereof is a standard manufacturing process and the equipment for rolling the assembly of FIGS. 1, 2 and 3 is not substantially different than rolling equipment heretofore employed in metal plate manufacturing facilities. The entire assembly is heated to an initial temperature of about 1850° F. to 2150° F. The amount of rolling passes required depends upon the total desired thickness reduction of the assembly which, in turn, is primarily dictated by the required thickness of the clad steel products that are to result from the manufacturing process. As the rolling process continues, the temperature of the assembly can be dropped so that it remains in a range of about 1550° to 2150° F.

Figure 4:
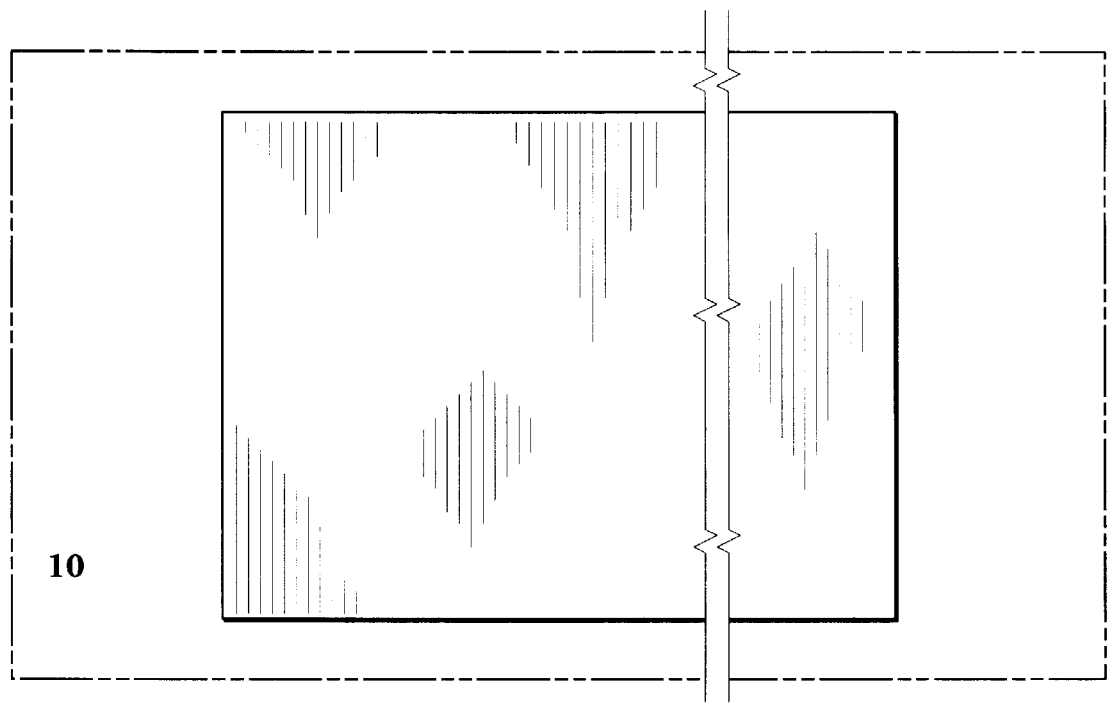
FIG. 4 is a top plan view of a stacked array assembly showing in solid outline representative dimensions before the assembly is subjected to a rolling or hydraulic press process and, in dotted outline, representative dimensions of the stacked array after the rolling process to indicate the changes in area dimensions of the stacked array.

Rolling the stacked assembly to achieve diffusion bonding of the cladding plates to the base plates results in decreased thickness of both cladding and base plates and a corresponding increase in the area of the assembly. FIG. 4 shows diagrammatically, (but not by way of proportions), an example of a assembly 10, such as shown in FIGS. 1–3 before rolling and, by dotted outline 50, the increase in the peripheral dimensions of the assembly that is achieved by rolling.

When pressing is employed to achieve bonding of the cladding plates to the base plates very little, if any, reduction in thickness of the cladding and base plates occur, therefore pressing, such as by hydraulic pressing, is usually employed only when the base and cladding plates are of thicknesses desired in the finished product.

After the rolling or pressing steps have been completed, the assembly is disassembled by cutting around the peripheral edge of the enlarged area assembly to remove the portions that include rail 22. Since rail 22 is preferably formed of steel material essentially the same is that of base plates 12 and 18, no relevant goal is achieved by the rolling process with respect to the area that is defined by rail 22 and this area is typically considered to be waste. Accordingly, this portion of the rolled product is removed by cutting away leaving clad plates wherein all portions of the clad plates are defined on one surface by a corrosion resistant clad material. The separator compound layer 20 allows the clad plates to be easily separated, that is, the characteristic of the separator compound layer 20 is to prevent any type of bonding of cladding plates 14 and 16 with each other. The particular chemical composition of separator compound layer 20 is not a part of this disclosure since separator compositions are in commercial use. In any event, the result of the process is the provision of two clad plates wherein the cladding is secured to the base plates by forge bonding.

The process described to this point does not use a cladding activator between the cladding plates and the base plates. The method described up to this point provides a clad metal product wherein cladding is secured to a base plate having a shear strength in excess of 40,000 PSI which is about twice the shear strength achieved with previous bonding methods that have not recognized the criticality of removing all water and oxygen prior to rolling or pressing. Such shear strength is sufficient for a few industrial applications. However, most industrial applications require a greater shear strength and for this purpose a cladding activator is employed in the assembly as will now be described.

Returning to FIG. 3, in a most preferred embodiment of the assembly and in the method of practicing the invention, cladding activator, indicated by numerals 52 and 54, is formed on cladding plates 14 and 16 before the assembly is fabricated. This cladding activator is preferably nickel phosphorous and most preferably, Ni4P. It has been discovered that using Ni4P cladding activator achieves significantly higher shear strengths in the resultant clad metal plate products. In fact, by using Ni4P cladding activator clad plates having a shear strength of 57,000 PSI have been obtained.

Further, it has been learned that the best method of applying cladding activator alloys to the cladding plates is by electrolessly depositing Ni4P onto one surface of each of the base plates or cladding plates with application to the cladding plates being preferred. When applied in this manner the activator has a thickness in the assembly of FIG. 3 of about 0.002 inches.

When a cladding activator is used, such as shown in FIG. 3, the subassembly, after extraction of water and oxygen, is heated to at least the solidus temperature of the cladding activator, that is, at least the temperature of the incipient melting point of the cladding activator, at which temperature the subassembly is pressed or rolled to complete bonding of the cladding plates to the base plates. This minimum temperature is typically about 1850° F.

The stacked assembly of FIGS. 1–3 can be successfully used for cladding base plates 12 and 18 of thicknesses up to about 30 millimeters or less. For base plate thicknesses exceeding 30 millimeters, and most certainly for base plate thicknesses greater than 50 millimeters, the manufacturing process is being completed employing a single base plate, cladding plate and cover plate utilizing an assembly similar to that illustrated in FIG. 2 of U.S. Pat. No. 4,869,422 but incorporating the improvements in the manufacturing processes as set forth herein.

Throughout this description the step of bonding the cladding plates to the base plates has been described as rolling or hydraulically pressing the heated assembly. By this is meant that bonding can be achieved by applying pressure to the heated assembly either with or without the use of rollers.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A method of manufacturing clad metal plate products employing:
    a bottom base plate, a first cladding plate, a second cladding plate and a top base plate, the peripheral dimensions of the cladding plates being less than the peripheral dimensions of the base plates comprising the steps of:
    (1) applying cladding activator to a surface of each of said cladding plates, the cladding activator being selected from Ni4P and Ni6P;
    (2) assembling said bottom base plate, said first cladding plate, a separator compound, said second cladding plate and said top base plate in stacked array with said surface of said first cladding plate having said cladding activator in contact with a surface of said bottom base plate and said surface of said second cladding plate having said cladding activator in contact with a surface of said top base plate and with said separator compound between said first and second cladding plates;
    (3) positioning a metal rail between said base plates and circumferentially of said cladding plates;
    (4) welding said base plates to said rail to form an assembly having a closed environment encompassing said cladding plates;
    (5) removing from said closed environment substantially all water and oxygen by evacuating said close environment followed by charging said closed environment with a dry inert gas followed by again evacuating said closed environment while heating the assembly to a temperature of about 250° F., the closed environment being evacuated to about $10^{-3}$ millibars to form a closed substantially oxygen and water free environment;
    (6) heating said closed assembly to at least the solidus temperature of said cladding activator;
    (7) hot rolling said assembly while heated to compress said assembly to desired width, length and thickness to cause said first cladding plate to bond to said bottom base plate and said second cladding plate to bond to said top base plate; and
    (8) disassembling said assembly at said separator compound layer to provide a first and a second clad plate.

2. A method of manufacturing a clad metal plate product according to claim 1 wherein said dry inert gas is dry argon gas.

3. A method of manufacturing a clad metal plate product according to claim 2 wherein the steps of charging followed by evacuation are carried out at least two times.

4. The method of manufacturing a clad metal plate product according to claim 1 wherein said cladding activator is electrolessly applied to a surface of said cladding plate.

* * * * *